United States Patent [19]

Petrzelka

[11] Patent Number: 4,482,337

[45] Date of Patent: Nov. 13, 1984

[54] UNIVERSAL JOINT

[75] Inventor: Miloslav Petrzelka, Much-Kranüchel, Fed. Rep. of Germany

[73] Assignee: Uni-Cardan Aktiengesellschaft

[21] Appl. No.: 331,792

[22] Filed: Dec. 17, 1981

[30] Foreign Application Priority Data

Dec. 23, 1980 [DE] Fed. Rep. of Germany ....... 3048846

[51] Int. Cl.$^3$ .......................... F16D 3/26; F16D 3/41
[52] U.S. Cl. ..................... 464/128; 464/132
[58] Field of Search .............. 464/132, 125, 128, 129, 464/130, 134, 905

[56] References Cited

U.S. PATENT DOCUMENTS

| 2,081,505 | 5/1937 | Padgett | 464/128 |
| 2,336,579 | 12/1973 | Venditty et al. | 464/128 X |
| 3,074,255 | 1/1963 | Reinecke | 464/130 X |
| 4,129,016 | 12/1978 | Olson, Sr. | 464/128 |
| 4,129,343 | 1/1978 | Janssen | 464/132 X |

FOREIGN PATENT DOCUMENTS

| 1122781 | 1/1962 | Fed. Rep. of Germany . |
| 2737557 | 8/1977 | Fed. Rep. of Germany . |
| 2625960 | 3/1979 | Fed. Rep. of Germany | 464/132 |
| 2933505 | 2/1981 | Fed. Rep. of Germany . |
| 1188398 | 4/1970 | United Kingdom | 464/132 |
| 1580718 | 8/1976 | United Kingdom . |
| 0588411 | 1/1978 | U.S.S.R. | 464/132 |

Primary Examiner—Stuart S. Levy
Assistant Examiner—Daniel P. Stodola
Attorney, Agent, or Firm—Toren, McGeady and Stanger

[57] ABSTRACT

A universal joint having a first and a second yoke connected with a trunnion cross including bearing pins supported in bores of the yokes joining the yokes together includes a bearing bush, roller bearings and a bearing ring between the bearing pin and the inner wall of the bore in the yoke. The universal joint is provided with radial play between the yoke and the bearing pin of the trunnion cross over a limited portion of the length of the bearing pin, with the radial play increasing in a direction radially outwardly of the trunnion cross. The radial play is provided by structuring at least one of the bearing pins, the bearing ring and the bearing bush with a conical configuration. Alternatively, the bearing bush and the bearing ring may be formed as one part with play relative to each other in order to provide the radial play of the joint.

9 Claims, 18 Drawing Figures

UNIVERSAL JOINT

The present invention relates generally to a universal joint and particularly to a joint which consists of a pair of joint yokes or of two pivot bearings which are connected with a shaft flange with a trunnion cross member being supported in bores of the yokes or of the pivot bearings, the joint consisting of roller members, a bearing bush and an inner bearing ring.

Universal joints of the type to which the present invention relates are known in the prior art, for example in German Pat. No. 1,122,781 include bearing bushes which are designed in such a manner that, in the unloaded condition of the drive shaft, the bearing faces of the pins are not parallel to those of the bearing bushes. As a result, a gap existing between the pin and the bush increases from the center of the joint outwardly thereof.

Devices of this type involve disadvantages in that the needles can no longer be accurately guided. Furthermore, since the rolling members are in direct contact with these faces, a considerable risk of tilting arises.

It is also known from prior art arrangements, for example from German Offenlegungsschrift No. 27 37 557, that the load acting on a pivot bearing may be distributed among a number of bearing needles so that the properties of the bearing of the universal joint clutch will be improved and so that service life thereof is prolonged. For this purpose, the bearing pin in such prior art arrangements is ground to have a slightly elliptical configuration so that a plurality of bearing needles will receive the operating forces acting between the bearing pin and the bearing bush. It will be apparent from these prior art devices that the method of production involved will also cause difficulties if the bearing pins are to be provided with perfectly elliptical running faces.

In view of the foregoing, the present invention is directed toward a provision of a universal joint which is structured in such a way that without additional expense optimum utilization of the bearing capacity may be achieved.

SUMMARY OF THE INVENTION

Briefly, the present invention relates to a universal joint assembly comprising first and second yoke means and trunnion cross means including bearing pin means supported in bores of the first and second yoke means joining the yoke means together. Bearing bush means, roller bearing means and bearing ring means are provided between the bearing pin means and the yoke means and at least one said bearing pin means, said bearing ring means and said bearing bush means are structured to provide over a limited portion of the length thereof radial play between the yoke means and the bearing pin means, which radial play increases in a direction radially outwardly of the center of the trunnion cross means.

Therefore, in accordance with the invention, provision is made for at least one of the bearing bush means, the bearing ring means and the bearing pin means to be provided over a portion of their length and/or circumferential area with a radially outwardly increasing play relative to the adjoining component.

The advantage of such a design is that the rolling members of the joint are always guided so as to be perfectly parallel to the center axis of the pin and that by changing the shape of one of the bearing components elastic deformation is achieved so that torque load will be optimized in that the rolling members will be more uniformly loaded over their entire length.

In order to permit easy production of the required play in order thereby to achieve an elastic effect of one of the components, an essential feature of the invention whereby the play is obtained provides for the pin to have a conical face over a portion of the length thereof. Alternatively, the bearing ring means may have a conical face or the bearing bush may be formed with a conical face.

In a second embodiment of the invention providing an alternative solution the bearing bush and the inner ring are arranged to be formed as one part with play being provided therebetween. The bearing bush and the inner ring may be joined together at their radially innermost parts.

The advantage of the above design is that, if under a torque load, the bearing bush itself can be elastically deformed it may adjust itself to the inner diameter with the joint yoke bore and the pivot bearing respectively. In this case the needle bearing is also more evenly loaded over the entire length of the individual needles. The design achieves optimum utilization of bearing capacity and in addition it operates to extend the service life of the joint.

In accordance with a further feature of the invention, the bearing bush and the bottom of the bearing bush may be formed as separate components. The advantages of separating the bearing bush bottom from the bearing bush itself is that these parts become easier to produce.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is a cross-sectional view showing a joint assembly in accordance with the present invention wherein a bearing pin thereof has been provided with a conical face and with an inner bearing ring which has been shrunk on;

DETAILED DESCRIPTION OF THE PREFERRED EMBODIMENTS

Figure 1:
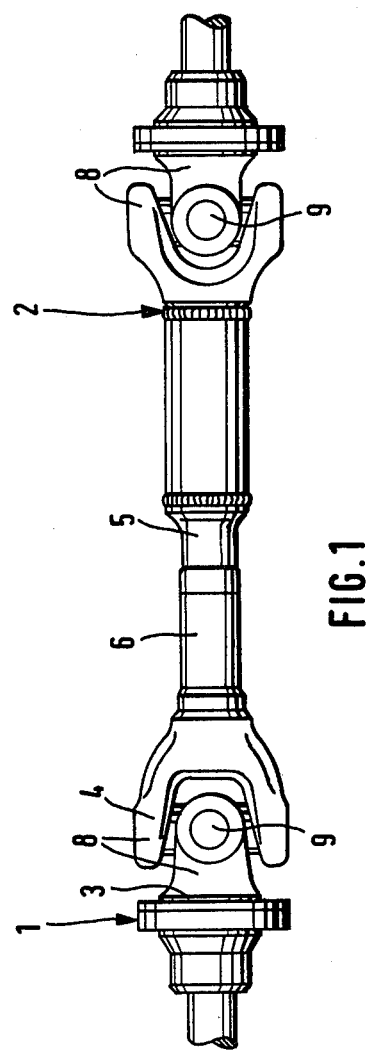
FIG. 1 is a longitudinal overall view of a shaft assembly carrying universal joints which may be formed in accordance with the invention.

Referring first to FIG. 1 of the drawings, there is shown an overall shaft assembly including universal joints which may be constructed in accordance with the present invention. The shaft assembly of FIG. 1 comprises two coaxial drive shaft sections 1 and 2 which carry at their outer ends universal joints 3 and 4 each having yoke arms which are connected together by a trunnion cross number 9. At its inner end, the drive shaft section 1 shown in FIG. 1 is structured as a solid shaft 5 and a drive shaft section 2 is provided as a hollow shaft. The solid shaft 5 and the hollow shaft 6 are nonrotatably joined together by spline means which enable axial movement therebetween.

Figure 2:
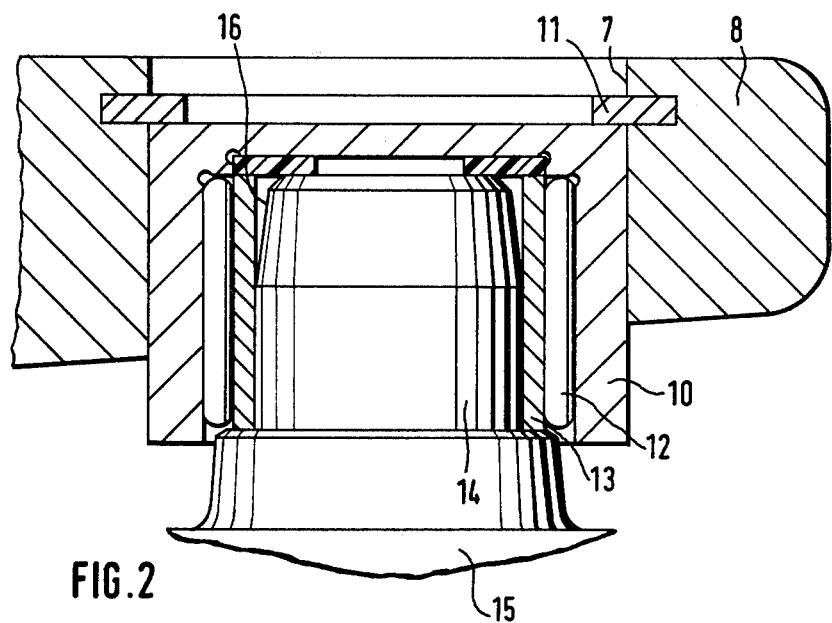

The universal joint assembly of the present invention is shown in greater detail in FIG. 2 which depicts part of an assembly by depicting in detail an individual component part thereof. As shown in FIG. 1, the joint assembly in accordance with the invention may consists of a yoke arm 8 having a bore 7 within which there is received a bearing bush 10 which is axially secured by means of a securing ring 11. In the bearing bush 10, roller bearings 12 are guided with the roller bearings 12 being arranged between the bearing bush 10 and an inner bearing ring 13.

The inner bearing ring 13 is received upon the bearing pin 14 of the cross member 15 over a substantial part of its inner diameter. It will be noted that the bearing pin 14 is formed, about its circumference on the radially outermost end thereof, with a conically shaped face 16. The conical face 16 assures that the inner bearing ring 13 will permit elastic deformation when under a torque load.

It should be understood that instead of a conical face it is alternatively possible to provide a spherical face or a face with a similar configuration having the same effect as the conical or spherical face.

Figure 3:
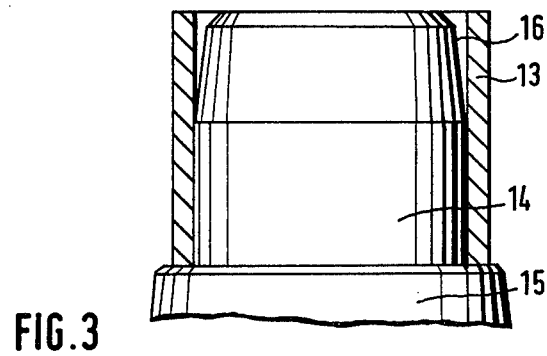
FIG. 3 is a sectional view showing parts of the assembly of FIG. 2.

FIG. 3 shows the configuration of the bearing pin 14 of the trunnion cross member 15, with the pin 14 being depicted as an individual component together with the inner bearing ring 13. It will be noted that the pin 14 is formed with the conical face 16 which cooperates with the inner bearing ring 13.

Figure 4:
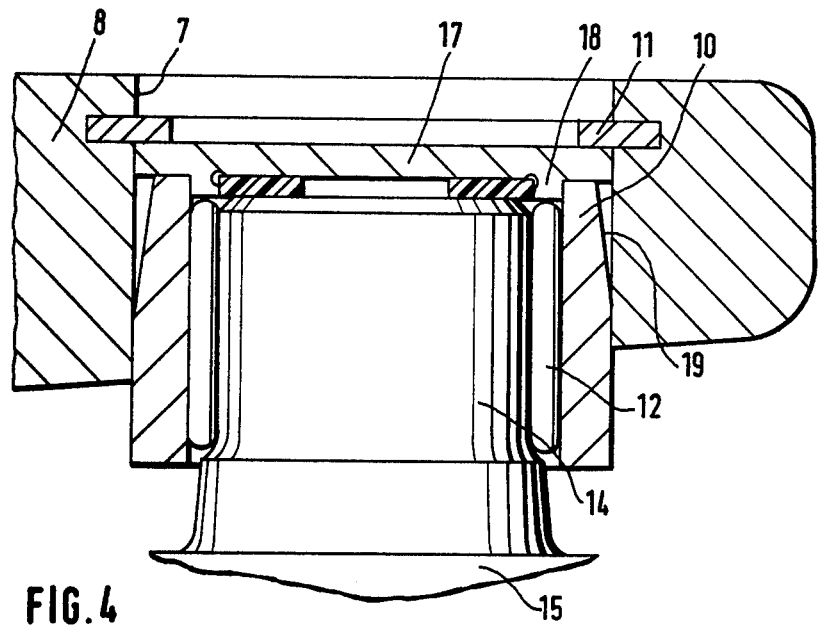
FIG. 4 is a sectional view showing an assembly with the bearing bush in two parts, the outer diameter being beveled with the bush being guided through a centering part in the bottom.

A further embodiment of the invention is illustrated in FIG. 4. In the embodiment of FIG. 4 there is shown an assembly including a yoke arm 8 which is again formed with the bore 7 holding therein the bearing bush 10 by operation of the securing ring 11. The bearing pin 14 of the trunnion cross member 15 is shown in FIG. 4 as having a cylindrical configuration and the bearing rollers 12 are positioned to run directly on the cylindrical face of the bearing pin 14. Again, the roller bearings 12 are guided within the assembly by the bearing bush 10.

The bearing bush 10 is formed with a separate bearing bush bottom member 17 having a cylindrical projection 18 which operates to center the inner diameter of the bearing bush 10. The bearing bush bottom member 17 is centered with its outer diameter within the bore 7 of the yoke arm 8. With the embodiment shown in FIG. 4, the outer diameter of the bearing bush 10 is formed with a conical face 19.

Figure 5:
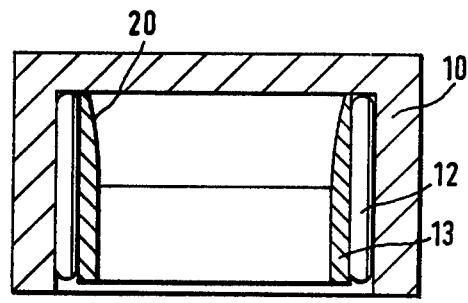
FIG. 5 is a sectional view showing an alternative arrangement in accordance with the invention.

In FIG. 5 there is depicted an embodiment of the invention with a closed bearing bush 10 having an inner diameter wherein the roller bearings 12 are received, the roller bearings 12 being centered by an inner bearing ring 13. The inner bearing ring 13 is formed with a conical face 20 which expands in a direction taken radially outwardly of the trunnion cross member 15.

Figure 6:
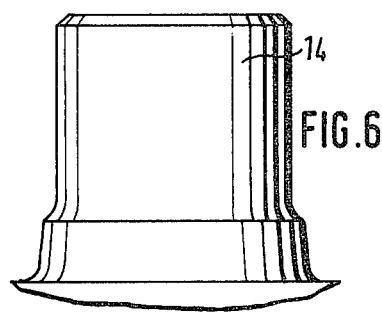
FIGS. 6, 7, 8, 10 and 10a are side views of bearing pins structured in accordance with the invention.
Figure 7:
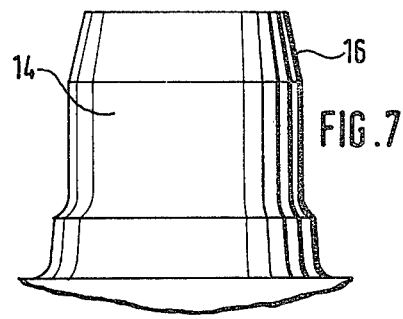
Figure 8:
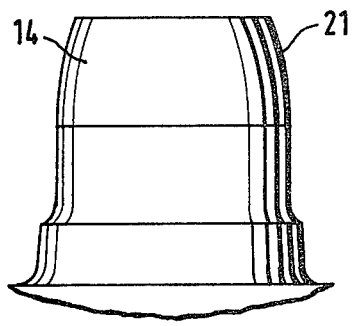

Further embodiments of the invention are shown in FIGS. 6, 7 and 8. In these figures of the drawing, different configurations of bearing pins 14 are shown which are possible for use with the defice of the present invention. FIG. 6 shows a bearing pin 14 having a generally cylindrical configuration. FIG. 7 shows a bearing pin having a conical face 16 and in FIG. 8 there is shown a bearing pin 14 which has been structured with a spherical face 21.

Figure 9:
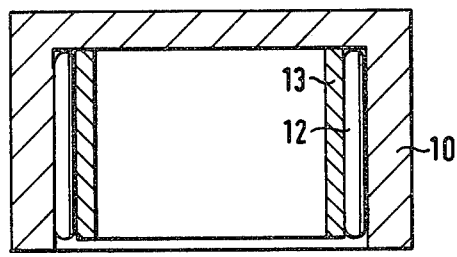
FIG. 9 is a sectional view showing parts of an assembly wherein the bearing pins of FIGS. 6, 7, 8, 10 and 10a may be used.
Figure 10:
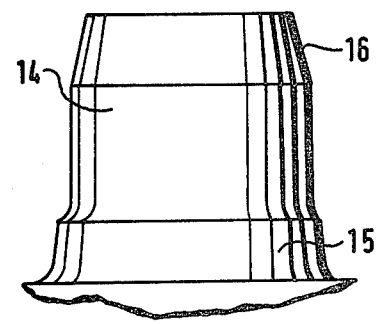
Figure 10A:
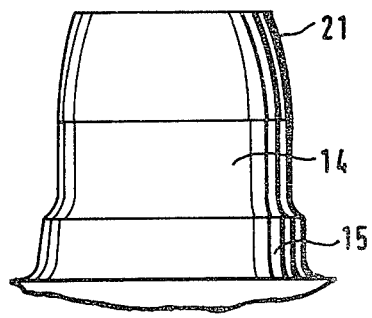

FIG. 9 merely depicts an assembly including a bearing bush 10 having a cylindrical inner and outer face with roller bearings 12 being received in an inner bearing ring 13 which also is formed with a cylindrical inner and outer face. Only the bearing pins 14 of the cross member 15 are to be provided, as shown in FIGS. 10, and 10a with a conical face 16 or with a spherical face 21. Thus, with an arrangement such as that shown in FIG. 9, bearing pins 14 of the type depicted in FIG. 10 and in FIG. 10a may be utilized.

Figure 11:
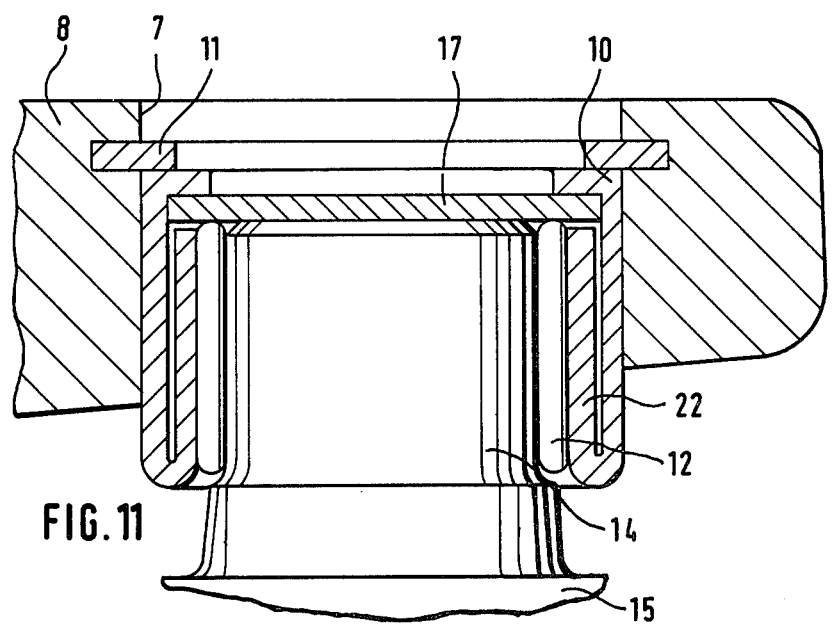
FIGS. 11, 12, 13 and 14 are sectional views of assemblies showing further embodiments of the invention.

FIG. 11 illustrates a further embodiment of the invention wherein there is again provided a yoke on 8 having a bearing bush 10 affixed in a bore 7 by means of a securing ring 11. Roller bearings 12 are directly arranged on the bearing pin 14 of the trunnion cross member 15. In the embodiment of FIG. 11, a bearing bush 10 is provided which is formed in a double walled configuration in two parts. The bearing bush 10 is formed in one piece with the inner ring 22 which is arranged at a distance from the outer wall of the bearing bush 10 and which is integral therewith. The outer wall of the bearing bush 10 and the inner ring 22 are joined together at the radially inner parts thereof. In FIG. 11, the bearing bush bottom 17 is formed separately from the bearing bush 10. The single component design of the bearing bush 10 permits elastic deformation of the inner ring 22 relative to the outer wall of the bearing bush 10.

Figure 12:
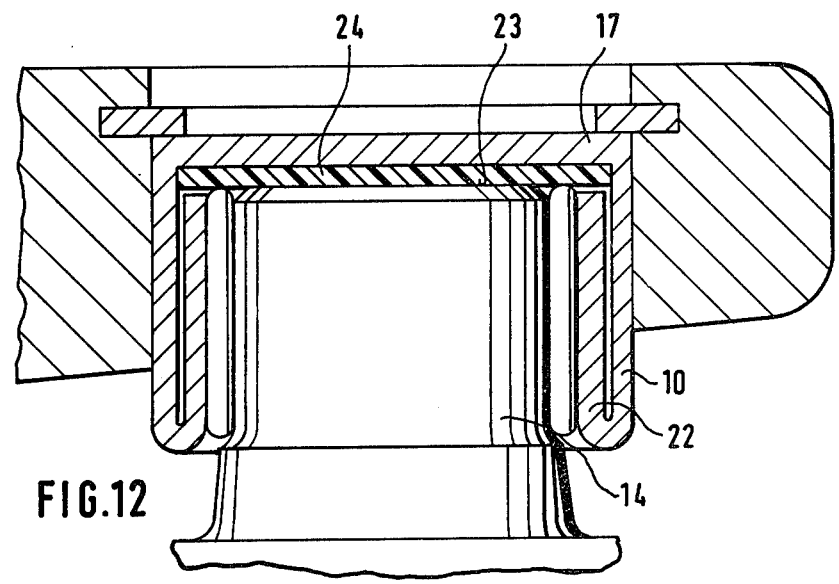

FIG. 12 illustrates an embodiment which is in principle similar to the embodiment of FIG. 11 in that the bearing bush 10 and the inner ring 22 are joined together at their radially innermost ends in order to form a single component part. The difference in the embodiment of FIG. 11 resides in the fact that the bearing bush bottom member 17 is formed as one part with the overall composite bearing bush 10. Additionally, between the end face 23 of the bearing pin 14 and the bearing bush bottom member there is provided a washer 24 whose purpose is to prevent the formation of grooves between the end face 23 and the bearing bush bottom member 17.

Figure 13:
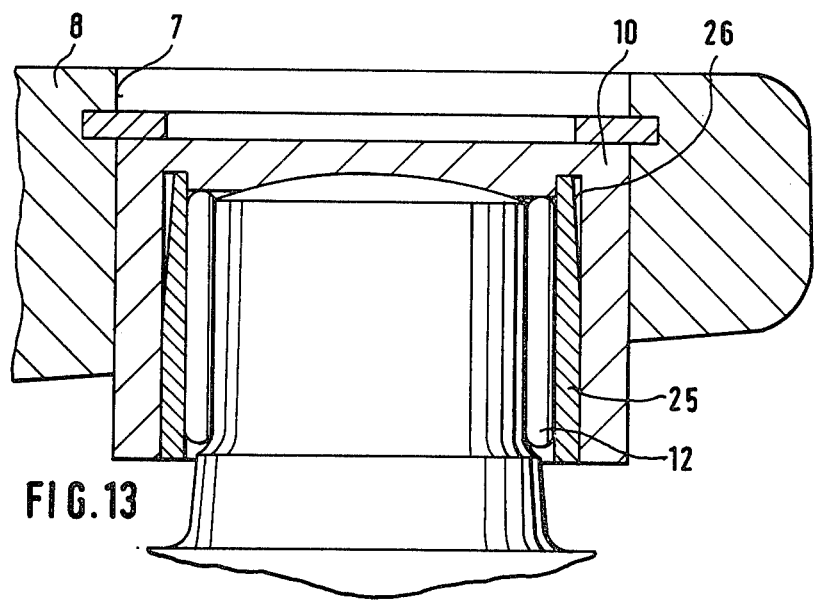

In FIG. 13 there is depicted an embodiment of the invention wherein, once again, the yoke arm 8 includes a bore 7 which again received the bearing bush 10 and additionally an inner ring 25 arranged the bearing bush 10 and roller bearings 12. The outer face of the inner ring 25, at the radially outermost end thereof, is provided with a conical face 26 and the ring 25 can be deformed elastically in the axial and radial direction. The inner ring 25 is internally guided by being centered in the bottom member of the bearing bush 10. Thus, in the embodiment of FIG. 13 there is provided a bearing bush with an inner ring centered in the bush bottom member with play being provided between the inner ring and the bearing bush.

Figure 14:
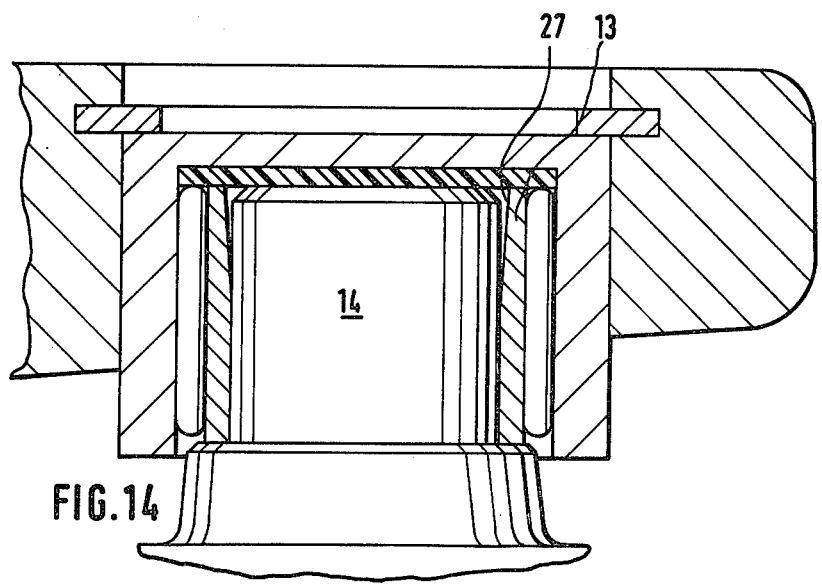
Figure 15:
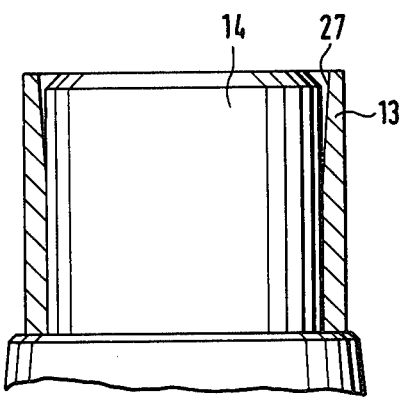
FIG. 15 is a sectional view showing in somewhat greater detail the bearing pin and bearing ring of an embodiment somewhat similar to that shown in FIG. 14.

FIGS. 14 and 15 show an embodiment of the invention wherein an inner ring is provided with the play existing between the inner ring and the bearing pin of the trunnion cross. In the embodiment of FIGS. 14 and 15 there is shown an inner bearing ring 13 which, on its inner face, is formed with a conical surface or a spherical surface 27 which cooperates with the outer cylindrical face of the bearing pin 14.

Figure 16:
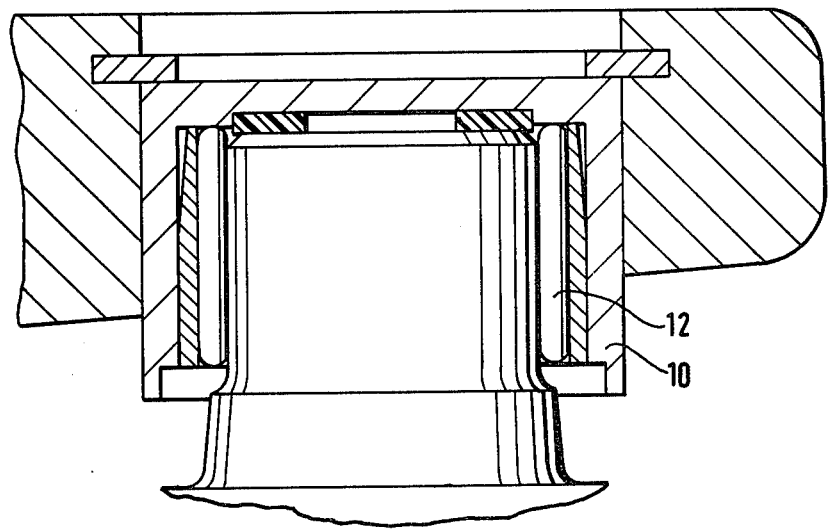
FIG. 16 is a sectional view of an assembly similar to that of FIG. 13.

FIG. 16 shows an embodiment which generally corresponds to that of FIG. 13 but without any centering in the bush bottom member. Thus, the embodiment of FIG. 16 although similar in principle to that of FIG. 13 does not have the inner ring guided in the bush bottom member.

Figure 17:
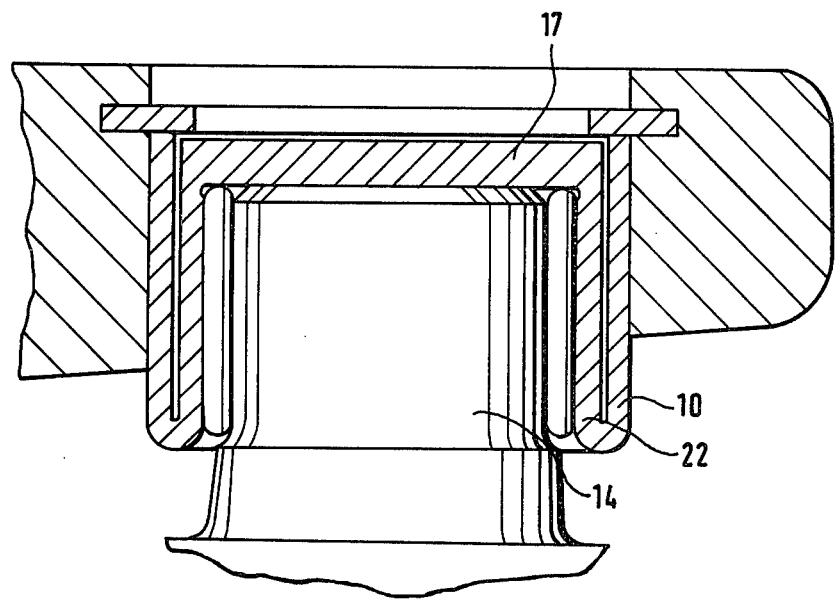
FIG. 17 is a sectional view of an arrangement corresponding to that depicted in FIG. 12.

FIG. 17 is a further embodiment involving a double walled bearing bush which is turned back on itself outwardly. The embodiment of FIG. 17 corresponds in principle to the embodiment of FIG. 12, the difference being that the inner ring 22 is connected with the bush bottom member and that the actual bearing bush is connected to the bush bottom member by means of the inner ring 22.

While specific embodiments of the invention have been shown and described in detail to illustrate the application of the inventive principles, it will be understood that the invention may be embodied otherwise without departing from such principles.

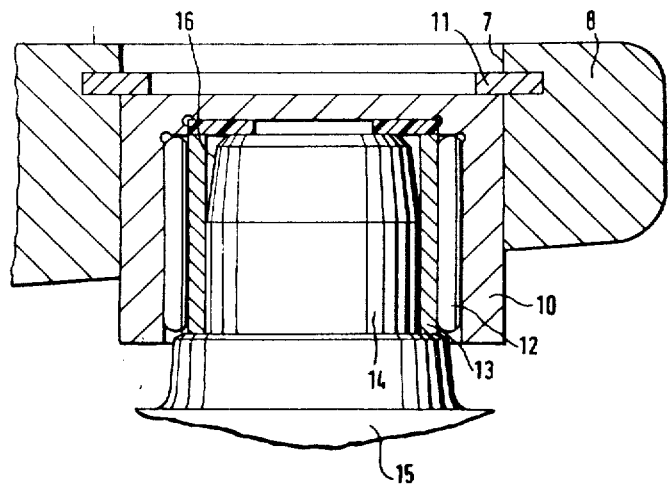

What is claimed is:

1. A universal joint comprising: first and second yoke means; trunnion cross means including bearing pin means supported in bores in said first and second yoke means joining said first and second yoke means together; bearing bush means, roller bearing means and bearing ring means provided in bearing engagement with each other over a length of bearing engagement between said bearing pin means and said yoke means; with at least one of said bearing pin means, said bearing ring means and said bearing bush means including means to provide over less than the full portion of said bearing length thereof and over only a part of their circumferential area radial play between said yoke means and said bearing pin means; said radial play gradually and continuously increasing in a direction radially outwardly of the center of the trunnion cross means.

2. A joint according to claim 1 wherein said means for providing is a conically shaped surface located on said bearing pin means to provide said radial play.

3. A joint according to claim 1 wherein said means for providing is a conically shaped surface located on said bearing ring means to provide said radial play.

4. A joint according to claim 1 wherein said means for providing is a conically shaped surface located on said bearing bush means to provide said radial play.

5. A joint according to claim 1 wherein said bearing bush means is formed with a bearing bush bottom member which is a component separate from said bearing bush means.

6. A joint according to claim 1 wherein said bearing bush means is formed with a bearing bush bottom member having therein means for centering said bearing ring means, and wherein said bearing ring means is radially centered relative to said bearing pin means by said bearing bush bottom member.

7. A joint according to claim 1 wherein said means for providing is a spherically shaped surface.

8. A universal joint comprising: first and second yoke means; trunnion cross means including bearing pin means supported in bores of said first and second yoke means joining said first and second yoke means together; bearing bush means disposed around said bearing pin means in said bores of said first and second yoke means; bearing ring means disposed between said bearing bush means and said bearing pin means; roller bearing means disposed in bearing engagement between said bearing pin means and said bearing ring means; said bearing bush means and said bearing ring means having a gap therebetween to provide radial play between said yoke means and said bearing pin means; said radial play gradually and continuously increasing in the area of said bearing engagement in a direction radially outwardly of said trunnion cross means; said bearing bush means and said bearing ring means being formed as one part and being connected together at their radially innermost ends, said bearing bush means and said bearing ring means being movable relative to each other to provide said radial play.

9. A joint according to claim 8 wherein said bearing bush means and said bearing ring means are formed integrally together as a single unitary member having a double walled configuration with said bearing bush means being formed at the outer wall thereof and with said bearing ring means being formed as the inner wall thereof, said single unitary member having formed therewith an integral bearing bush bottom member which is integrally joined with one of said inner wall or said outer wall of said integral member.

* * * * *

UNITED STATES PATENT AND TRADEMARK OFFICE
CERTIFICATE OF CORRECTION

PATENT NO. : 4,482,337

DATED : November 13, 1984

INVENTOR(S) : Miloslav Petrzelka

Page 1 of 2

It is certified that error appears in the above-identified patent and that said Letters Patent is hereby corrected as shown below:

The title page should be deleted to appear as per attached title page.

Signed and Sealed this

Thirtieth Day of July 1985

[SEAL]

Attest:

DONALD J. QUIGG

*Attesting Officer*   *Acting Commissioner of Patents and Trademarks*

United States Patent [19]

Petrzelka

[11] Patent Number: 4,482,337
[45] Date of Patent: Nov. 13, 1984

[54] UNIVERSAL JOINT

[75] Inventor: Miloslav Petrzelka, Much-Kranüchel, Fed. Rep. of Germany

[73] Assignee: Uni-Cardan Aktiengesellschaft

[21] Appl. No.: 331,792

[22] Filed: Dec. 17, 1981

[30] Foreign Application Priority Data

Dec. 23, 1980 [DE] Fed. Rep. of Germany ....... 3048846

[51] Int. Cl.³ .......................... F16D 3/26; F16D 3/41
[52] U.S. Cl. .................................... 464/128; 464/132
[58] Field of Search ............... 464/132, 125, 128, 129, 464/130, 134, 905

[56] References Cited

U.S. PATENT DOCUMENTS

| 2,081,505 | 5/1937 | Padgett | 464/128 |
| 2,336,579 | 12/1973 | Venditty et al. | 464/128 X |
| 3,074,255 | 1/1963 | Reinecke | 464/130 X |
| 4,129,016 | 12/1978 | Olson, Sr. | 464/128 |
| 4,129,343 | 1/1978 | Janssen | 464/132 X |

FOREIGN PATENT DOCUMENTS

| 1122781 | 1/1962 | Fed. Rep. of Germany . | |
| 2737557 | 8/1977 | Fed. Rep. of Germany . | |
| 2625960 | 3/1979 | Fed. Rep. of Germany | 464/132 |
| 2933505 | 2/1981 | Fed. Rep. of Germany . | |
| 1188398 | 4/1970 | United Kingdom | 464/132 |
| 1580718 | 8/1976 | United Kingdom . | |
| 0588411 | 1/1978 | U.S.S.R. | 464/132 |

Primary Examiner—Stuart S. Levy
Assistant Examiner—Daniel P. Stodola
Attorney, Agent, or Firm—Toren, McGeady and Stanger

[57] ABSTRACT

A universal joint having a first and a second yoke connected with a trunnion cross including bearing pins supported in bores of the yokes joining the yokes together includes a bearing bush, roller bearings and a bearing ring between the bearing pin and the inner wall of the bore in the yoke. The universal joint is provided with radial play between the yoke and the bearing pin of the trunnion cross over a limited portion of the length of the bearing pin, with the radial play increasing in a direction radially outwardly of the trunnion cross. The radial play is provided by structuring at least one of the bearing pins, the bearing ring and the bearing bush with a conical configuration. Alternatively, the bearing bush and the bearing ring may be formed as one part with play relative to each other in order to provide the radial play of the joint.

9 Claims, 18 Drawing Figures